United States Patent
Ellis et al.

(10) Patent No.: US 8,295,175 B2
(45) Date of Patent: Oct. 23, 2012

(54) SERVICE METRICS FOR MANAGING SERVICES TRANSPORTED OVER CIRCUIT-ORIENTED AND CONNECTIONLESS NETWORKS

(75) Inventors: Donald Ellis, Ottawa (CA); Paul Littlewood, Duluth, GA (US); Marc Holness, Ottawa (CA)

(73) Assignee: Ciena Corporation, Hanover, MD (US)

( * ) Notice: Subject to any disclaimer, the term of this patent is extended or adjusted under 35 U.S.C. 154(b) by 1598 days.

(21) Appl. No.: 10/741,296

(22) Filed: Dec. 19, 2003

(65) Prior Publication Data

US 2005/0068890 A1 Mar. 31, 2005

Related U.S. Application Data

(60) Provisional application No. 60/507,278, filed on Sep. 30, 2003.

(51) Int. Cl.
*G01R 31/08* (2006.01)
(52) U.S. Cl. .................. 370/235; 370/236; 370/252
(58) Field of Classification Search .................. 370/229, 370/395.2, 395.21, 395.43, 419, 420, 236.1, 370/236.2, 241.1, 242, 907, 235, 236, 252
See application file for complete search history.

(56) References Cited

U.S. PATENT DOCUMENTS

| | | | |
|---|---|---|---|
| 5,042,027 A * | 8/1991 | Takase et al. ................. | 370/252 |
| 5,768,255 A | 6/1998 | Brownmiller et al. | |
| 5,768,530 A | 6/1998 | Sandorfi | |
| 5,796,723 A | 8/1998 | Benchek et al. | |
| 5,914,794 A | 6/1999 | Fee et al. | |
| 6,005,694 A | 12/1999 | Liu | |
| 6,192,031 B1 | 2/2001 | Reeder et al. | |
| 6,222,848 B1 | 4/2001 | Hayward et al. | |
| 6,366,563 B1 | 4/2002 | Weldon et al. | |
| 6,594,047 B1 | 7/2003 | Ballintine et al. | |
| 6,650,646 B1 | 11/2003 | Galway et al. | |
| 6,681,232 B1 | 1/2004 | Sistanizadeh et al. | |
| 6,701,086 B1 | 3/2004 | Heiles | |
| 6,731,648 B1 | 5/2004 | Cotter | |
| 6,831,890 B1 | 12/2004 | Goldsack et al. | |
| 6,839,751 B1 * | 1/2005 | Dietz et al. ..................... | 709/224 |
| 6,853,619 B1 | 2/2005 | Grenot | |
| 6,914,883 B2 * | 7/2005 | Dharanikota ............... | 370/230.1 |
| 6,950,868 B1 * | 9/2005 | Faraldo, II .................... | 709/224 |
| 6,973,096 B2 | 12/2005 | Chappell et al. | |
| 7,043,541 B1 | 5/2006 | Bechtolsheim et al. | |

(Continued)

OTHER PUBLICATIONS

Final Office Action mailed Feb. 28, 2008 for U.S. Appl. No. 10/741,909.

(Continued)

*Primary Examiner* — Sai-Ming Chan
(74) *Attorney, Agent, or Firm* — Tyler S. Brown

(57) ABSTRACT

Described are a system and method for managing a service transported over a transport network between first and second service termination points. Packet traffic associated with the service is received at a service termination point connected to the transport network. Performance of the packet traffic is measured at the service termination point. The measured performance of the packet traffic and the service are correlated to produce a performance of service (PoS) service metric. Based on the PoS service metric, other service metrics associated with the service are correlated, including a rate of service (RoS) service metric and availability of service (AoS) service metric. These service metrics can be used to develop service level agreement (SLA) and service level metrics that define the operation of the service and operation of the network supporting those services.

24 Claims, 6 Drawing Sheets

U.S. PATENT DOCUMENTS

| | | | |
|---|---|---|---|
| 7,065,037 | B1 | 6/2006 | Viswanathan et al. |
| 7,221,674 | B2 | 5/2007 | Lim |
| 7,289,515 | B2 | 10/2007 | Kusumoto |
| 7,499,407 | B2 | 3/2009 | Holness et al. |
| 2001/0004352 | A1 | 6/2001 | Watanabe et al. |
| 2001/0047409 | A1* | 11/2001 | Datta et al. ............ 709/224 |
| 2002/0064149 | A1* | 5/2002 | Elliott et al. ............ 370/352 |
| 2002/0069278 | A1* | 6/2002 | Forslow ............ 709/225 |
| 2002/0073226 | A1* | 6/2002 | Sridhar et al. ............ 709/235 |
| 2002/0087696 | A1 | 7/2002 | Byrnes et al. |
| 2002/0143920 | A1* | 10/2002 | Dev et al. ............ 709/223 |
| 2002/0176450 | A1 | 11/2002 | Kong et al. |
| 2002/0196737 | A1* | 12/2002 | Bullard ............ 370/231 |
| 2003/0120765 | A1 | 6/2003 | Radi et al. |
| 2003/0131028 | A1 | 7/2003 | Radi et al. |
| 2003/0225549 | A1* | 12/2003 | Shay et al. ............ 702/182 |
| 2004/0105392 | A1* | 6/2004 | Charcranoon ............ 370/252 |
| 2004/0165600 | A1 | 8/2004 | Lee |
| 2004/0221202 | A1* | 11/2004 | Nye et al. ............ 714/38 |
| 2005/0071453 | A1 | 3/2005 | Ellis et al. |
| 2008/0186877 | A1* | 8/2008 | Balonado et al. ............ 370/254 |

OTHER PUBLICATIONS

Non-Final Office Action mailed May 19, 2008 for U.S. Appl. No. 10/666,372.
Notice of Allowance mailed Oct. 24, 2008 for U.S. Appl. No. 10/666,372.
Non-Final Office Action mailed Mar. 21, 2007 for U.S. Appl. No. 10/666,372.
Non-Final Office Action mailed Jul. 31, 2007 for U.S. Appl. No. 10/666,372.
Non Final Office Action mailed Aug. 24, 2007 for U.S. Appl. No. 10/741,909.
Non-Final Office Action mailed Nov. 26, 2007 for U.S. Appl. No. 10/666,372.
Non-Final Office Action mailed Mar. 15, 2006 for U.S. Appl. No. 10/666,372.
Final Office Action mailed Aug. 22, 2006 for U.S. Appl. No. 10/666,372.
Non-Final Office Action mailed Feb. 23, 2005 for U.S. Appl. No. 10/666,372.
Final Office Action mailed Aug. 23, 2005 for U.S. Appl. No. 10/666,372.

* cited by examiner

SERVICE METRICS FOR MANAGING SERVICES TRANSPORTED OVER CIRCUIT-ORIENTED AND CONNECTIONLESS NETWORKS

RELATED APPLICATION

This application claims the benefit of the filing date of U.S. Provisional Application, Ser. No. 60/507,278, filed Sep. 30, 2003, titled "Structured Addressing for Optical Service and Network Management Objects," the entirety of which provisional application is incorporated by reference herein.

FIELD OF THE INVENTION

The invention relates generally to communications systems. More particularly, the invention relates to a system and method for using service metrics to manage a service transported across a communication network in support of a Service Level Agreement (SLA).

BACKGROUND

Transport networks of today need to provide cost-effective transport for various types of client information, including multi-service traffic ranging from synchronous traffic (e.g., DS-1, DS-3, and STS-12) to asynchronous traffic (e.g., Internet Protocol (IP), Ethernet, and Asynchronous Transport Mode (ATM). Increasingly, service providers are operating their circuit-oriented services over transport networks based on synchronous optical network (SONET) or synchronous digital hierarchy (SDH) and their connectionless services over packet transport networks based on Ethernet, Multi-Protocol Label Switching (MPLS), IP, or combinations thereof.

Service providers offer such services to their customers under terms specified in contractual service level agreements or SLAs. The terms specified in the SLAs set forth deliverables against which the performances of the services are to be measured. To effectively manage their customer relationships, service providers thus want to be able to monitor their services as they are transported over the transport network, to ensure that each service is performing in accordance with its corresponding SLA.

Traditionally, responsibility for the proper operation of the transport network resides with a network operational support system (OSS), also referred to as network management. Network management performs a variety of management functions, including fault management, configuration or provisioning management, accounting, performance monitoring, and security. To accomplish these functions, the network elements in the transport network collect or generate information to be made available to the network management. This information is indicative of the functional performance of the transport facility (i.e., the network elements, paths, and links in the transport network), and is referred to as network-related information.

In contrast to the roles of the network management, service providers are responsible for order fulfillment, service assurance, and billing. In effect, the service providers manage the customers of their services and maintain customer relationships; when customers are experiencing problems with their services, they interact with their service providers. Often problems occur in the transport network of which service providers are unaware, unless notified thereof by a customer or alerted thereto by the network management.

Nonetheless, a service provider typically needs to consult with network management to obtain information necessary to corroborate or refute the customer's problem. Even then, the network-related information obtained from the network management does not directly identify any specific service. Consequently, the service provider must refer to other sources of information, such as telephone logs of customer calls and databases cross-referencing network resources to services, to piece together the full picture of a service's performance. Service providers encounter this same difficulty when network management alerts them of problems encountered in the transport network; the network-related information given to the service providers does not directly identify any affected service.

This inability to ascertain their services' performances handicaps service providers in the execution of their other service management functions. Without the ability to monitor a service's performance, it is difficult to determine if the service is performing in accordance with the SLA. Consequently, current SLAs tend not to specify significant detail about the service. Similarly, service providers lack service-specific metrics by which they can design (i.e., engineer) their transport networks for supporting the services properly. Moreover, the difficulty in correlating network problems to specific services complicates the task of billing customers accurately for their purchased services; customers expect to pay less than full price for services that did not perform as expected, but service providers experience inefficiencies when attempting to verify service downgrades and outages. Thus, there is a need for a system and method that enable service and network management functions to be more effectively executed than current techniques.

SUMMARY

In one aspect, the invention features a method for managing a service transported over a connection (e.g., a dedicated circuit or virtual connection) between first and second service termination points in a transport network. Traffic associated with the service is received at a service termination point connected to the transport network. Performance of the traffic is measured at the service termination point and correlated by the service termination point with the service to produce a performance of service (PoS) service metric.

In another aspect, the invention features a network element in an optical network. The network element comprises means for receiving traffic associated with the service, means for measuring performance of the traffic, and means for correlating the measured performance of the traffic and the service to produce a performance of service (PoS) service metric.

In yet another aspect, the invention features a network having a service termination point connected to a client network for receiving packet traffic associated with a service. The service termination point comprises means for measuring performance of the packet traffic, and means for correlating the measured performance of the traffic and the service to produce a performance of service (PoS) service metric.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Networks constructed in accordance with the present invention provide service providers with a variety of mechanisms for more closely managing the services purchased by their customers. A service, as used herein, is a guarantee of transport of customer-offered traffic with specific performance commitments. The service provider and possibly one or more carriers transport the customer-offered traffic over a transport network between service-termination points. Network elements at these service-termination points measure the performance of the service based on characteristics of the customer-offered traffic and correlate the measured performance with a specific service, to produce a performance of service metric (hereafter, referred to generally as PoS). In some embodiments of the invention, the service termination points collect and exchange PoS service metrics across the network over a service management channel. Having service metrics from both service termination points enables service providers to compare performance at both ends of the service.

From PoS metrics, service metrics called availability of service (AoS) and rate of service (RoS) are computed. Using these PoS, AoS, and RoS service metrics, service providers have additional tools for customizing service level agreements (SLAs) and service level specifications (SLSs) for their services, for pricing their offered services, and for determining whether their services are performing in accordance with the SLA and SLS.

The invention also enables network failures and faults to be correlated with specific services either in service reports that correlate service performance with the transport facility or in network reports that correlate performance of the transport facility with services. Personnel can obtain service metrics, service reports, and network reports directly from a network element at a service termination point or at an interior point in the network. This information is available in real-time; service personnel can obtain the information themselves directly and immediately respond to customers' service inquiries, without having to take the traditional routes involving network management.

Figure 1:
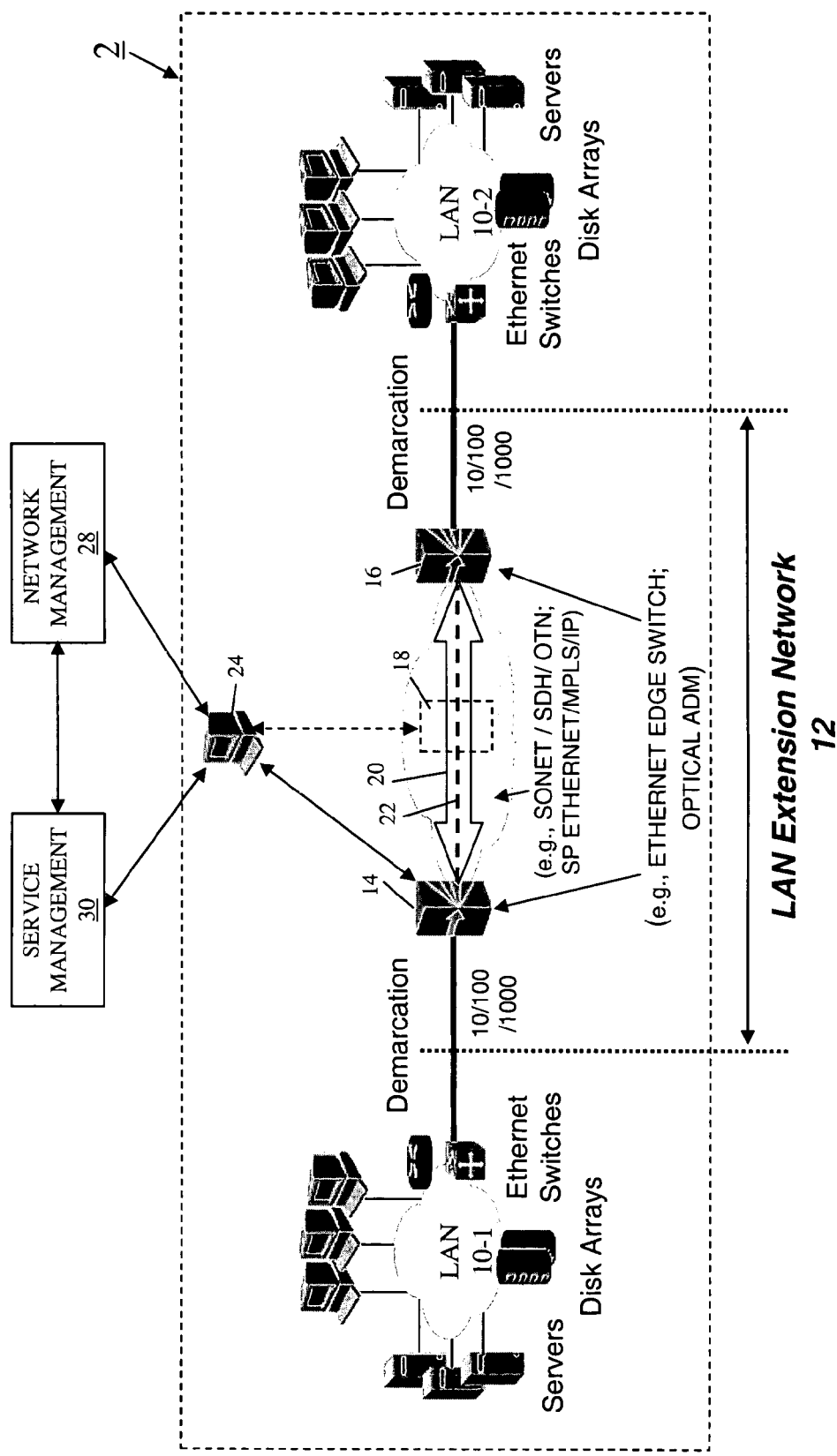
FIG. 1 is a block diagram of an embodiment of a network of networks for supporting a packet-based service, the network of networks including a plurality of local area networks (LANs) and an LAN extension network that carries service traffic between the LANs.

FIG. 1 shows an embodiment of a network of networks 2 constructed in accordance with the principles of the invention. The network of networks 2 includes a plurality of local area networks 10-1, 10-2 (generally, LAN 10) and a LAN extension network 12 that carries service traffic between the LANs 10. Examples of service traffic supportable by the present invention include 10/100/1000 Mbps Ethernet, Fiber Channel, and Internet Protocol (IP) services. The present invention can support other types of service traffic, preferably packet-based. Each LAN 10 includes, for example, storage arrays, servers, computer systems, and Ethernet switches. The LANs 10, also referred to herein as client networks, originate and terminate the service traffic passing over the LAN extension network 12. Although described with reference to the LANs 10, the principles of the invention apply also to carrying traffic between storage areas networks (SANs) across the extension network. In such instances, the LAN extension network 12 can instead be considered a SAN extension network.

The LAN extension network 12 can be a connectionless or connection-oriented local area network (LAN), metro-area network (MAN) or wide-area network (WAN), or any combination of connectionless and connection-oriented networks. An example of a connectionless network is the Internet. Communication over a connectionless network occurs according to the particular technology employed, examples of which include, but are not limited to, Ethernet, MPLS, IP, and combinations thereof. For example, MPLS can provide connection-oriented processing above a connectionless IP network. An example of a connection-oriented network is an optical network based on a synchronous data transmission standard such as Synchronous Optical Network (SONET), Synchronous Digital Hierarchy (SDH), or Optical Transport Network (OTN)). The LAN extension network 12 can itself be a network of networks, spanning a plurality of different service providers and carriers and including both connectionless and connection-oriented sub-networks.

A near-end edge service network element NE 14 is in communication with a far-end edge-service network element NE 16 through an intermediate or core network element NE 18. Communication among the NEs 14, 16, 18 is over a transport facility 20, in accordance with the particular standard used for data transmission: for example, SONET for an optical transport facility, IP for a packet-switched transport network. Transmission of Ethernet services over an optical transport facility, for example, is referred to as Optical Ethernet. Other types of transport facilities than optical transport can be used, such as wired or wireless transport, without departing from the principles of the invention.

Each NE 14, 16 is also in communication with a respective interface (not shown) at a demarcation point for communicating with one of the LANs 10; NE 14 communicates with the LAN 10-1, and NE 16 communicates with LAN 10-2. A service provider or carrier uses the LAN extension network 12 to support a service purchased by a customer under terms governed by an SLA. The NEs 14, 16, and 18 illustrate an oversimplified path by which traffic for a particular service traverses the LAN extension network 12. For optical transport networks, the NEs 14, 16 operate as add/drop multiplexers (ADMs) and customer traffic pertaining to the service travels from one edge-service NE 14 to the other edge-service NE 16 through the core NE 18 over a dedicated circuit or path. For connectionless networks, the NEs 14, 16 are, for example, Ethernet edge switches, and the service traffic is routed from the NE 14 to the NE 16 through the core NE 18. More than one service can traverse this particular set of NEs 14, 16, 18, although to simplify the description of the invention only a single service is described. The demarcation points are the termination end-points of the service in the LAN extension network 12. In one embodiment, each NE 14, 16 comprises the respective interface at the demarcation point. Other NEs in the LAN extension network 12 for carrying traffic of other services are not shown.

The near-end NE 14 associates a unique service identifier (hereafter, service ID) with the service traffic. The association of the service ID to the service traffic can occur at layer 1 (e.g., SONET) or at layer 2 (e.g., packet/Ethernet). An example of a layer 1 implementation is to maintain a table or database that cross-references service traffic arriving at a particular port of the near-end NE 14 with the service ID. An example of a layer 2 implementation is to include the service ID in each packet of the service traffic. The service management 30 or network management 28 can install the service ID at the near-end NE 14 when the service is provisioned.

Each edge-service NE 14, 16 computes counts for various performance parameters based on characteristics of the service traffic. In one embodiment, the particular counted performance parameters are taken from a standard set of Management Interface Base II (MIB II) objects (e.g., INFRAMES) defined for managing TCP/IP networks. Traditionally, these performance parameters serve as a measure of performance at a port (e.g., Ethernet or Fiber Channel port) in the client network 10-1, but are not correlated to any service in particular. In accordance with the principles of the invention, service providers correlate these counts (i.e., performance metrics) to a particular service. More specifically, the NE 14 uses the service ID to correlate computed performance metrics with the specific service from which the counts were obtained. This correlation of a performance metric to a specific service produces a performance of service (PoS) attribute or service metric that can be monitored by the service provider. Examples of PoS service metrics are given in more detail below.

When service providers derive PoS service metrics from standard performance metrics, such as the MIB II objects, customers and service providers can compare their independently computed service metrics to verify each other's evaluation of the service performance. For instance, a customer can measure the performance of a purchased service within the client network 10-1 based on counts obtained for certain MIB objects obtained at an Ethernet port. The service provider, based on the same MIB objects, measures the performance of the service within its own LAN extension network 12. With its own gathered performance metrics, the customer can verify service performance reports from the service provider, and the service provider, with its own gathered service metrics, can confirm or deny service inquires raised by the customer. Moreover, as described below, other service metrics derive from PoS service metrics, thus providing additional service metrics that can be computed and similarly compared by customer and service provider.

In one embodiment, some service-related communication between the edge-service NEs 14, 16 occurs over a service management channel (SMC) 22. For circuit-oriented communications over an optical network, exemplary implementations of the SMC 22 include using 1) path overhead (POH) bytes, and 2) Client Management Frames (CMF) of the Generic Framing Procedure (GFP). These implementations of the SMC 22 are described in U.S. patent application Ser. No. 10/666,372, filed Sep. 19, 2003, titled "System and Method for Managing an Optical Networking Service," the entirety of which patent application is incorporated by reference herein. For connectionless communications, an exemplary implementation of the SMC 22 is with Ethernet Virtual Connection (EVC) technology. In general, an EVC is an association between two or more User Network Interfaces (UNIs), where a UNI is a standard Ethernet interface at the demarcation point. Each EVC limits the exchange of Ethernet packets between those UNIs that are part of the same EVC.

Over either type of SMC 22 (i.e., circuit-oriented or connectionless), the NEs 14, 16 periodically exchange performance monitor (PM) reports and service metrics, such as the PoS, RoS, and AoS service metrics described herein. Further, for embodiments having the SMC 22, the core NE 18 can be configured to access and process the contents of the SMC 22 (the core NE is referred to as being service-aware). Accordingly, the core NE 18 serves as a portal for monitoring the service between the service termination points. An operator of the network management 28 or service management 30 can use the core NE 18 to intercept the service PM reports and service metrics produced by the edge-service NEs 14, 16 and collect historical performance information (i.e., service monitoring). The near-end NE 14 and the core NE 18 can accumulate and store service-related information for a predetermined length of time, and with the accumulated information, the operator can evaluate the performance of the service against an SLA. As described herein, service-related information includes the service state of the interfaces with the client networks 10, the path state, PM reports, service reports that correlate service degradation with the transport facility, and network reports that correlate network faults to affected services.

To enable access by the network management 28 and service management 30 to the service-related information, a computing system 24 is in communication with the near-end NE 14 or, alternatively, with the core NE 18. Network management 28 is also in communication with the service management 30. As described above, the network management 28 is responsible for performing fault management, configuration or provisioning management, accounting, performance monitoring, and security (i.e., FCAPS) for the LAN extension network 12. The service management 30 is responsible for the fulfillment, assurance, and billing (FAB).

Figure 2:
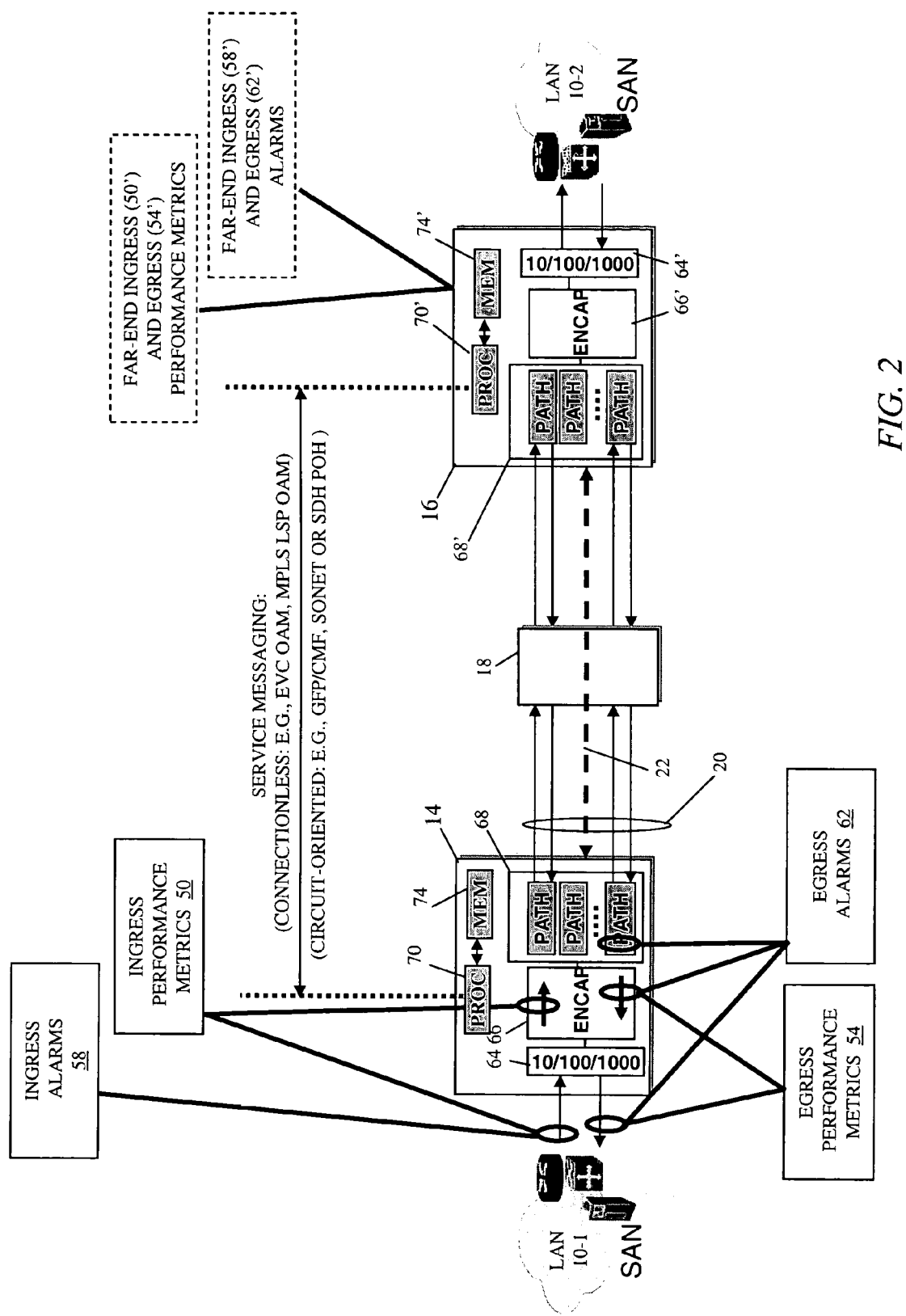
FIG. 2 is a block diagram of an embodiment of the LAN extension network including a near-end network element in communication with a far-end network element over an optical or packet transport facility.

FIG. 2 shows an embodiment of the LAN extension network 12 having the edge-service NEs 14, 16 in communication with each other over the transport facility 20. In this embodiment, the NEs 14, 16 use the SMC 22 to transmit service-related information (i.e., service messaging). The SMC 22 passes through the core NE 18, which is capable of processing the service-related information carried by the channel 22. Each edge-service NE 14, 16 includes a respective service-traffic interface 64, 64' (generally, interface 64), a respective encapsulation unit 66, 66' (generally, encapsulation unit 66), and a respective network adapter 68, 68' (generally adapter 68). In general, the interface 64 provides a physical interface between the LAN extension network 12 and the client network 10-1 for 10BaseT, 100BaseT, or 1000BaseX for 10, 100, and 1000 Mbps, respectively, Ethernet packet traffic. The encapsulation unit 66 prepares the packet traffic for transmission over the LAN extension network 12. The network adapter 68 adapts the packet traffic to a particular path or connection for transmission over the transport facility.

In one embodiment, the LAN extension network 12 is a circuit-oriented optical network based on an optical transmission standard, such as SONET. In this embodiment, the encapsulation unit 66 applies Generic Framing Procedure (GFP) and virtual concatenation (VCAT) technologies to the service traffic, and the adapter 68 multiplexes the service traffic on an appropriate Synchronous Transport Signal (STS) path. Service messaging between the NEs 14, 18 occurs over the SMC 22 embodied, for example, by the GFP/CMF or by the POH.

In another embodiment, the LAN extension network 12 is a connectionless network based on packet-based transport (e.g., Optical Ethernet and MPLS). Ethernet Virtual Connections (EVCs) or MPLS Label Switched Paths (MPLS LSPs) can operate to implement the SMC 22. The encapsulation unit 66 provides layer 2 encapsulation using one of a variety of encapsulation mechanisms such as, for example, Media Access Control (MAC) in MAC (MiM), MAC in MPLS, MAC in Point-to-Point Protocol (PPP), with or without Q-tag insertion. The network adapter 68 transmits the service traffic over an appropriate EVC or MPLS LSP.

The NEs 14, 16 also include a processor 70 for measuring performance metrics, computing PoS service metrics from the performance metrics (examples listed below), and computing RoS and AoS service metrics from the PoS service metrics, as described in connection with FIG. 3. Memory 74 stores the service-related information, such as the service metrics and PM reports.

Performance metrics measured by the near-end NE 14 are of two types: ingress and egress performance metrics 50, 54, respectively. Ingress performance metrics 50 are collected from service traffic signals entering into the interface 64 and into the encapsulation unit 66. Examples of ingress PoS service metrics for Ethernet Private Line (EPL) and Fiber Channel services, computed from performance metrics measured from service traffic signals entering the interface 64 and correlated to a specific service, are listed in Table 1 below.

TABLE 1

| Performance of Service (PoS) service metric | Ethernet | Fiber Channel |
|---|---|---|
| INFRAMES | All frames received (OK, errored, discarded, PAUSE, control, etc . . . ). | Number of Class 2, 3 and F Fiber Channel frames received. |
| INFRAMESERR | Frames received that contain a LAN FCS error. This includes fragments and jabbers, but excludes undersized and oversized frames which have a valid LAN FCS. | N/A |
| INFRAMESDISCDS | Valid frames (i.e., a good LAN FCS and within the accepted size range) received and discarded because of ingress FIFO overflow caused by, for example: 1) traffic exceeding the WAN bandwidth capacity, 2) the WAN port being operationally down (WAN link down), or 3) GFP CSF/RFI CMFs received. | Number of Fiber Channel frames discarded due to ingress FIFO overflow. Should not occur in normal running conditions (always 0 when EXTREACH/SUBRATE = DISABLE). |
| INOCTETS | All data octets received on the interface (in good and errored frames). Includes destination address (DA)/source address (SA)/TL/FCS. | All data octets received on the interface. It can be approximated using the following formula: Rx Data bytes − (Rx Control bytes * 3) + Rx Symbol errors2. |
| INOCTETSERR | A count of octets in the frames included in INFRAMESERR (LAN FCS error). | Rx Disparity errors + Rx Symbol errors3 |

Examples of ingress PoS service metrics for Ethernet Private Line (EPL) and Fiber Channel services, computed from performance metrics measured from service traffic signals entering the encapsulation unit 66 and correlated to a specific service, are listed in Table 2 below:

TABLE 2

| Performance of Service (PoS) service metric | Ethernet | Fiber Channel |
|---|---|---|
| OUTFRAMES | Frames transmitted on this interface. | Number of Class 2, 3 and F FC frames received. |
| OUTFRAMESERR | Frames that could not be transmitted because of errors, or that were transmitted with errors. This could include LATECOLL or EXCESSCOLL (when in half duplex mode), FIFO underrun (due to some internal memory errors), or purposely sending an Ethernet frame with an invalid FCS. An example is a frame received from the WAN side with an invalid LAN FCS. It also includes frames received from the WAN side which are less than 64 bytes (with valid FCS or invalid FCS). | N/A |
| OUTFRAMESDISCDS | Valid frames discarded because of Egress FIFO overflow because of, for example, 1) traffic exceeding the LAN capacity (e.g. STS3C into a 10BT) or 2) the LAN port being operationally down. | Number of FC frames discarded due to egress FIFO overflow. Should not occur in normal running conditions. May indicate the distance is more than what is supported (always 0 when EXTREACH/ SBURATE = DISABLE). |
| OUTOCTETS | Octets transmitted out of the interface. Includes DA/SA/TL/FCS. | All data octets transmitted on the interface. It can be approximated using the following formula: Tx Data bytes − (Tx Control bytes * 3) + Tx 10B_ERR. |
| OUTOCTETSERR | A count of octets in the frames include in OUTFRAMESERR. | Number of 10B_ERR code transmitted. |

Egress performance metrics 54 are collected from service traffic signals exiting from the interface 64 and from the encapsulation unit 66. Examples of egress PoS service metrics 54 for Ethernet Private Line (EPL) and Fiber Channel services corresponding to service traffic in the interface 64 are shown in Table 2 above and examples of egress PoS service metrics corresponding to service traffic in the encapsulation unit 66 are shown in Table 1 above. Other PoS service metrics can be collected in addition to or instead of those listed above without departing from the principles of the invention.

The near-end NE 14 also detects ingress and egress alarms 58, 62, respectively, and correlates such alarms to a specific service. Ingress alarms are obtained from service traffic signals entering the interface 64. Examples of ingress alarms for an Ethernet Private Line (EPL) service are shown in Table 3 below, including an example of their associated severity and an associate responsive action (taken by the NE 14):

TABLE 3

| Ingress Alarms | Severity | Actions |
|---|---|---|
| Loss of Signal | Critical | Trigger Link Down |
| Loss of 8B10B Synch | Critical | Trigger Link Down |
| Link Down | Critical | Send Client Management Frame Client Signal Fail to far end NE |
| Client Rx Signal Degrade | Medium | None |
| Client Rx Excessive Error Ratio | Medium | None |

Egress alarms are obtained from service traffic signals exiting from the interface 64, from the encapsulation unit 66, and from the network adapter 68. Examples of type ingress alarms at the interface 64 for an EPL service are shown in Table 4 below, including an example of their associated severity and an associated responsive action taken by the NE 14:

TABLE 4

| Egress Alarms | Severity | Actions |
|---|---|---|
| Client Service Mismatch | Critical | Frame from far end discarded |
| Far End Client Rx Signal Fail | Medium | Client laser shut down |

Table 5 below lists examples of egress alarms detected at the encapsulation unit 66, including their associated level of severity and an associated responsive action taken by the NE 14:

TABLE 5

| Egress Alarms | Severity | Actions |
|---|---|---|
| Loss of Frame Delineation | Critical | Trigger Link Down |
| Link Down | Critical | Send CMF RFI to far end NE |
| WAN Rx Signal Degrade | Medium | None |
| Wan Rx Excessive Error Ratio | Medium | None |
| Bandwidth Mismatch | Critical | Reduce throughput |

Table 6 below lists examples of egress alarms detected at the network adapter 68, including their associated level of severity and an associated responsive action by the NE 14:

TABLE 6

| Egress Alarms | Severity | Actions |
|---|---|---|
| Rx Loss of Multi-Frame | Critical | Trigger Link Down |
| Rx Loss of Sequence | Critical | Trigger Link Down |
| Rx Loss of Alignment | Critical | Trigger Link Down |
| Loss of Frame Delineation | Critical | Trigger Link Down |
| Other standard STS alarms | | |

The far-end NE 16 computes the same types of ingress and egress performance metrics 50', 54' and monitors for the same types of ingress and egress alarms 58', 62' as the near-end edge service NE 14.

Figure 3:
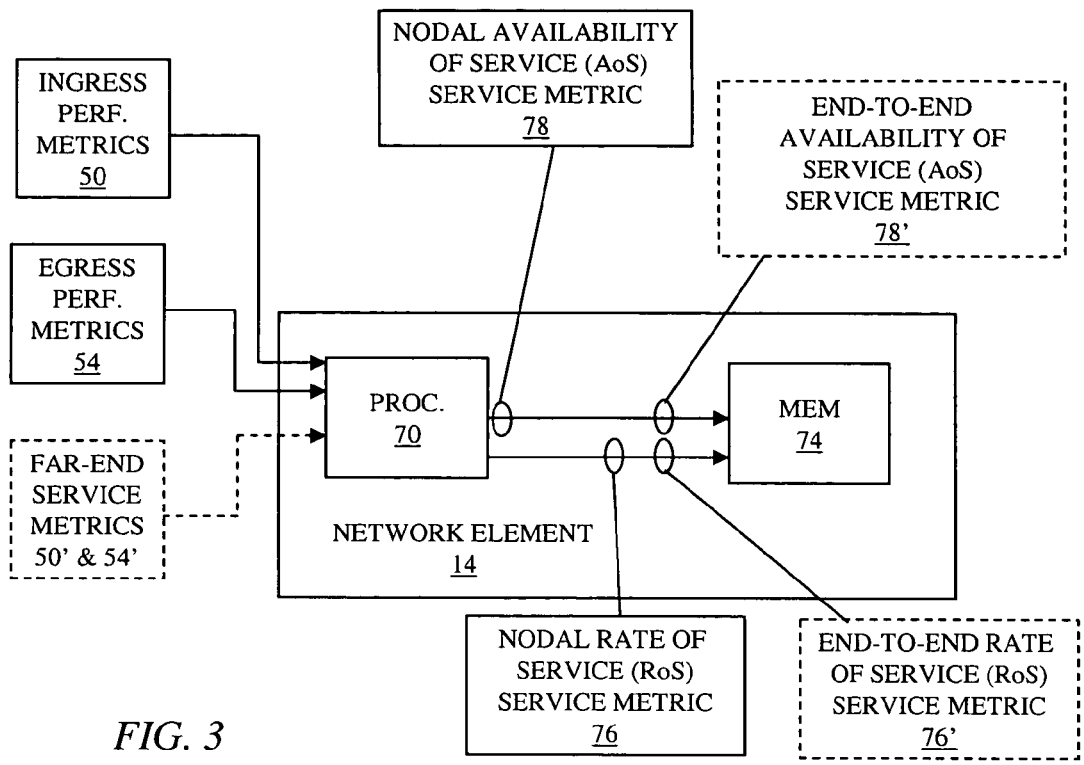
FIG. 3 is a block diagram of the near-end network element generating service metrics based on performance metrics.

FIG. 3 shows an embodiment of the near-end NE 14 with the processor 70 and memory 74. The processor 70 computes PoS service metrics from the ingress and egress performance metrics 50, 54, and from these PoS metrics, computes a rate of service (RoS) service metric 76 and an Availability of Service (AoS) service metric 78. The RoS and AoS service metrics 76 are stored in the memory 74.

The RoS service metric provides a mechanism by which the service provider can measure the actual bandwidth utilization of the service. In general, each RoS service metric 76 is a PoS service metric measured over a specific time interval. For example, if the PoS service metric is INOCTETS, the corresponding RoS service metric is, for example, INOCTETS per second. As another example for measuring RoS, if the PoS service metric is INFRAMES, the corresponding RoS service metric is, for example, INFRAMES per second. Further, the RoS service metric provides a measurable basis by which a cost can be associated with the service. Accordingly, each RoS service metric is a billing attribute that can be specified in both the SLA and SLS.

For Ethernet (and WAN) services, the AoS service metric 78 is determined from the INFRAMESERR and INFRAMES parameters; for Fiber Channel services, the AoS service metric is based on the INOCTETSERR parameter. In brief, a service is deemed to have become unavailable (UnAvailable Service or UAS) upon the occurrence of ten consecutive severe errored seconds (SES). An SES is deemed to have occurred for an Ethernet or WAN service when the percentage of incoming frames for a one-second interval exceeds 1%. For Fiber Channel, more than 500 octets having errors in a one-second interval causes an SES. Table 7 below shows summarizes the conditions defining AoS for Ethernet, WAN, and Fiber Channel services.

TABLE 7

| Performance of Service (PoS) Service Metric | Ethernet & WAN | Fiber Channel |
|---|---|---|
| Errored Seconds (ES) | At least one INFRAMESERR occurs during a one-second interval | At least one INOCTETSERR occurs during a one-second interval. |
| Severe Errored Seconds (SES) | Seconds where INFRAMESERR/INFRAMES > 0.01 | Seconds where INOCTETSERR > 500 |
| Unavailable Seconds (UAS) | 10 consecutive SESs | |

In embodiments having the SMC 22, the far-end NE 16 periodically transmits its computed PoS, RoS 76', and AoS 78' service metrics to the near-end NE 14. Having the service metrics from both ends of the service, the processor 70 of the NE 14 can compare near-end RoS with far-end RoS and near-end PoS with far-end PoS. To determine an overall AoS applicable to the full span of the service (in contrast to the AoS computed for a single node, described above), the NE 14 combines the AoS statuses of both NEs 14, 16. For example, if the AoS service metric is UAS (i.e., unavailable) at either or both of the NEs 14, 16, the overall AoS for the service is unavailable.

Having access to service metrics gathered at both ends of the service, service providers can now specify and verify quality of service (QoS) and class of service (CoS) service metrics in their SLAs and SLSs that account for service performance at both service ends (i.e., not only at egress at the near-end NE 14, but also at ingress at the far-end NE 16). For example, a service provider can now specify different end-to-end RoS service metrics to define different levels of CoS: that is, services guaranteed a higher RoS are deemed to have a higher CoS. Similarly, different end-to-end AoS service metrics can serve to define different levels of QoS.

Similar to the service messaging from the far-end NE 16 to the near-end NE 14, the near-end NE 14 transmits its computed service metrics to the far-end NE 16. The core NE 18, if service-aware, can intercept service messages traveling in both directions, and thus perform similar end-to-end comparisons between RoS and PoS service metrics and end-to-end evaluations of AoS, CoS, and QoS as those performed by the near-end NE 14. Accordingly, network management 28 and service management 30 are each able to access the core NE 18 to review this information.

Figure 4:
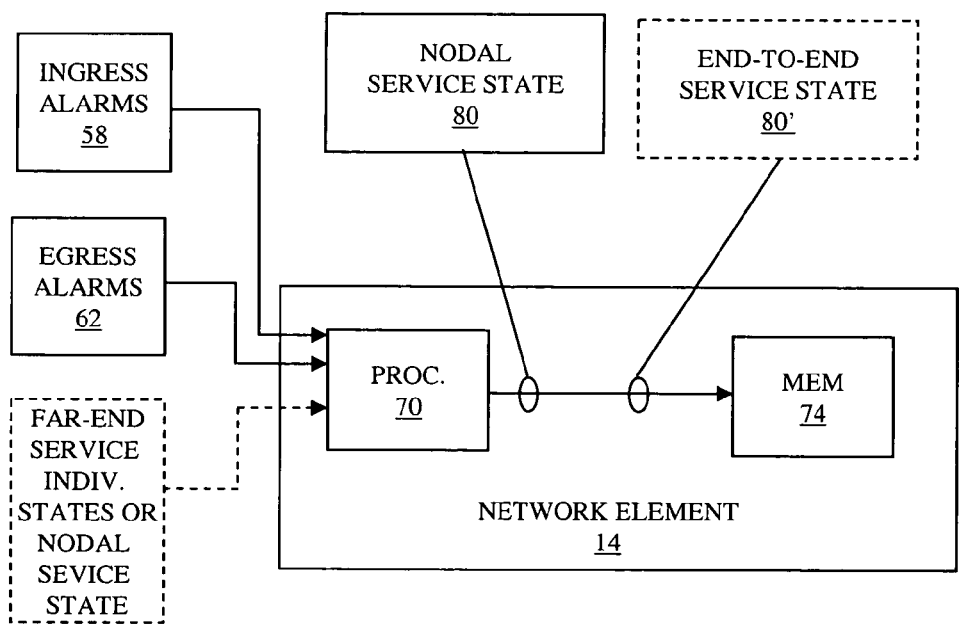
FIG. 4 is a block diagram of the near-end network element generating a service state based on alarms.

FIG. 4 shows an embodiment of the near-end NE 14 in which the processor 70 receives the ingress and egress alarms 58, 62 detected by the near-end NE 14 and determines a nodal service state 80 therefrom. Table 8 below shows the service state from the perspective of one NE only (e.g., NE 14), referred to as a nodal service state.

TABLE 8

| Individual State | Green | Red (if any) | Yellow (if any) | Alarm Reports Generated |
|---|---|---|---|---|
| Client Link | Ok | Link fail | Link degrade | Near End NE major service alarm |
| UNI | Ok | UNI fail | UNI/GFP degrade | Near End NE major service alarm |
| Path | Ok | Path fail/AIS | NE Path degrade | Near End NE major service alarm |
| Far End Client Signal Fail | Ok | FE Link fail | — | Far End NE major service alarm Near End NE link fail Near end NE major service alarm |

The overall nodal service state 80 depends upon the individual states of the client link, user network interface (UNI), path, and far-end client signal. For the overall service state to be "green" (i.e., operating in accordance with the SLA) the individual states need to be "OK" for each of the client link, user network interface (UNI), path, and far-end client signal. If any of the listed facility elements fail, the overall service state 80 becomes "red." If any of the link, UNI, or path degrades, the service state becomes "yellow." When the overall service state 80 is "red," the NE issues a network alarm report that correlates the failing facility element with the affected service. For example, if the NE 14 determines that the path has failed, the NE 14 issues an alarm report identifying the facility elements on the failed path and each service affected by the failure. Consider for example that the path passing from NE 14 to NE 16 through NE 18 has failed, the network alarm report may read "Path 14-16-18 is failed, affecting services with service identifiers GR100 and NR104." The network alarm report is made available to the network and service management 28, 30 (by way of the computing system 24). With this information, the network management can readily determine the failing network resources, and the service provider can readily correlate the network problem to specific affected services. Note, for purposes of this description, network faults are considered included in the term network failure, although network faults and network failures differ at least in their degree of severity.

The NE 14 also generates a service alarm report if the service degrades. For example, for a path that degrades, the service alarm report may read "Service with service identifier GR110 is degraded on the path through network elements 14, 18, and 16." Service alarm reports, like network alarm reports, are made available to the network and service management 28, 30.

In embodiments having the SMC 22, the far-end NE 16 periodically transmits its individual service states to the near-end NE 14 (or its overall nodal service state). The near-end NE 14 combines its individual states with those of the far-end to produce an overall end-to-end service state 80'. Table 9 below shows the end-to-end service state 80' as determined by the state information obtained from both the near-end and far-end NEs 14, 16.

TABLE 9

| Service State | Green | Red (if any) | Yellow (if any) | Reports |
|---|---|---|---|---|
| Client Link | Ok | Link fail | Link degrade | Near End NE major service alarm |
| Near End UNI | Ok | UNI fail | UNI/GFP degrade | Near End NE major service alarm |
| Near End Path | Ok | Path fail/AIS | NE Path degrade | Near End NE major service alarm |
| Far End Path | Ok | Path fail/AIS | FE Path degrade | Far End NE minor service alarm |
| Far End UNI | Ok | FE UNI fail | FE UNI/GFP degrade | Far End NE minor service alarm |
| Far End Client Link | Ok | FE Link fail | FE Link degrade | Far End NE minor service alarm |

The end-to-end service state 80' depends upon the individual states of the client link, user network interface (UNI), path, and far-end client signal for both the near-end and far-end NEs 14, 16. For the end-to-end service state 80' to be "green," every one of these individual states need to be "OK". If any of the listed individual states fail, the end-to-end service state 80' becomes "red;" if any degrades, the end-to-end service state 80' becomes "yellow." Network and service alarm reports of network failures and degraded services are like those described above for a single edge service state.

Figure 5:
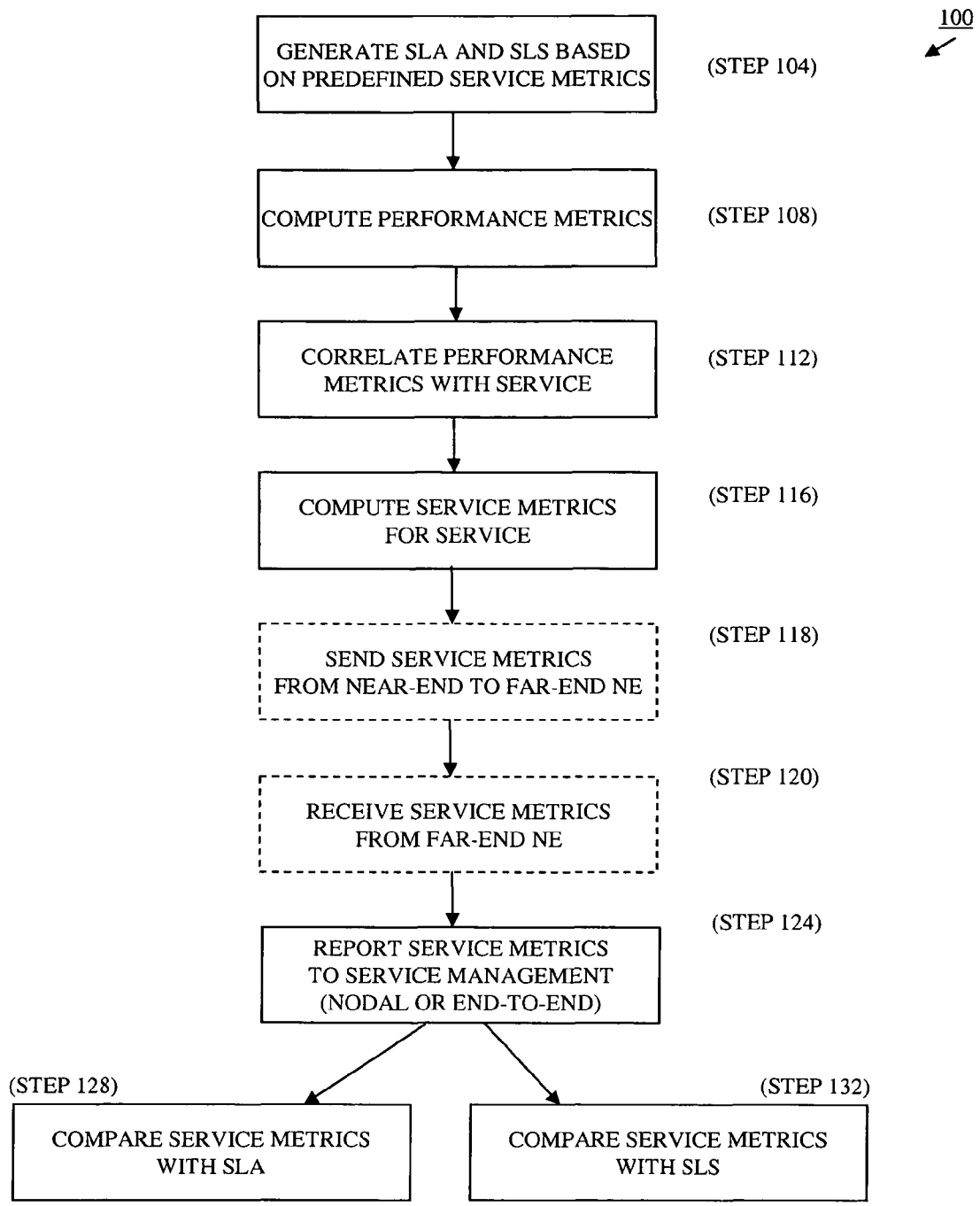
FIG. 5 is a flow diagram of an embodiment of a process of managing a service.

FIG. 5 shows an embodiment of a process 100 for managing a service. The service management generates (step 104) an SLA and a SLS using any combination of the service metrics described herein (i.e., PoS, RoS, AoS, CoS, and QoS). The type of service, or ToS, is another attribute that the service provider can use to identify client frames or the service. Typically, the service metrics are specified differently in the SLS than in the SLA, because the documents are intended for different audiences. In general, service metrics are defined with more specificity and AoS in finer granularity in the SLS than in the SLA. For example, the SLS can specify RoS as INFRAMES/sec and INOCTETS/sec, whereas the SLA as Mbps; and as another example, the SLS can specify AoS in unavailability per second, whereas the SLA as unavailability per day.

The near-end NE 14 computes (step 108) performance metrics and correlates (step 112) these performance metrics with a specific service. Using the computed performance metrics, the near-end NE 14 computes (step 116) various service metrics of the invention.

In an embodiment having the SMC 22, the near-end NE 14 sends (step 118) its computed service metrics to the far-end NE 16 and receives (step 120) from the far-end NE 16 service metrics computed by the far-end NE 16. For this embodiment, the near-end NE 14 can compare the service metrics determined at the near-end with those determined at the far-end to obtain an end-to-end account of the performance of the service. For example, if the near-end NE 14 counted 1000 OUTOCTETS transmitted for a particular service, but the far-end NE 16 counted only 990 INOCTETS received, then the performance of the end-to-end service is seen to be 99%.

In step 124, the service metrics are reported to the service management 30. Such reporting of service metrics are referred to as service performance correlation (SPC) reports. The reporting can be active or passive; by active meaning that the near-end NE 14 automatically transmits a report to the computer system 24, by passive meaning that the service metric information is stored (for a predetermined interval) at the NE 14 until service management 30, for example, accesses the NE 14. The SPC report can be a nodal report based on those service metrics as determined by the NE 14 only, or an end-to-end report based on service metrics as determined at both ends of the service. With these reports, the service management 30 can compare (step 128) the current performance of the service with the values used in the SLA. The service management 30 can also compare (step 132) the current performance of the service with the values defined in the SLS.

Figure 6:
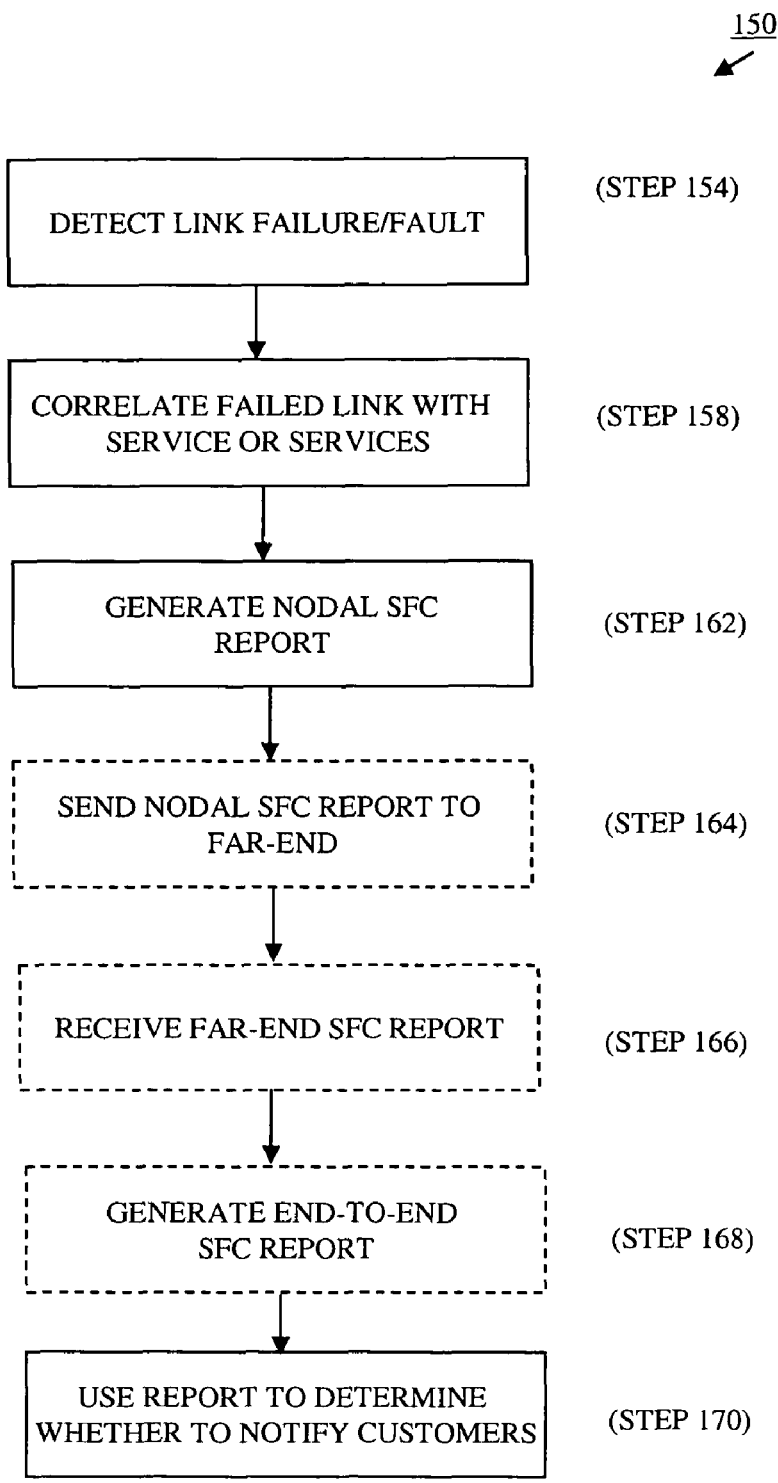
FIG. 6 is a flow diagram of an embodiment of a process of correlating a facility element with a service.

FIG. 6 shows an embodiment of a process 150 of producing a service fault correlation (SFC) report correlating a failing transport facility element to each affected service. The process 150 is illustrated from the perspective of the near-end NE 14. The process 150 can be performed by any service-aware NEs supporting the service, including the core and far-end NEs 18, 16. The near-end NE 14 detects (step 154) a failure of a facility element (e.g., a link between the near-end NE 16 and the core NE 18) and correlates (step 158) the failing facility element with each affected service. The near-end NE 14 then generates (step 162) a nodal SFC report that identifies the failed link and each affected service. In one embodiment having the SMC 22, the NE 14 sends (step 164) the nodal SFC report to the far-end NE 16 and receives (step 166) a nodal SFC report from the far-end NE 16. The NE 14 then produces (step 168) an end-to-end SFC report correlating the nodal SFC reports determined at both ends of the service. The service management 30, the network management 28, or both receive the SFC report (nodal or end-to-end) and are able to discern from the report the affected service(s). The service management 30 can then refer to the SLA and SLS governing the service to determine (step 170) whether to notify affected customers.

Figure 7:
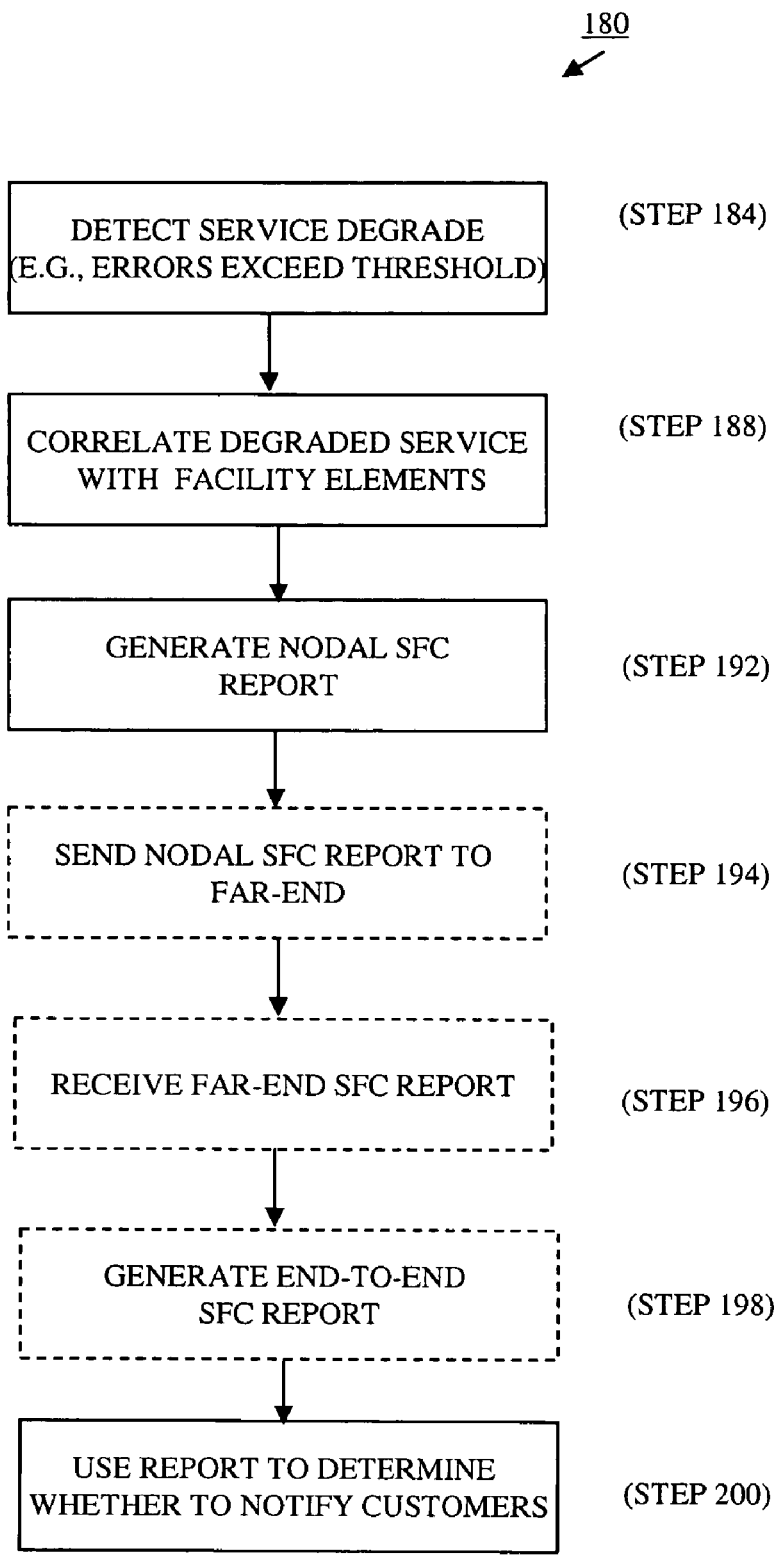
FIG. 7 is a flow diagram of an embodiment of a process of correlating a service with a facility element.

FIG. 7 shows an embodiment of a process 180 for producing an SFC report correlating a degraded service to a facility element. Again, the near-end NE 14 is used to describe the process 180, although any service-aware NE can correlate a service to a facility as described herein. The near-end NE 14 detects (step 184) a service degrade and correlates (step 188) the degraded service and the facility elements (e.g., NEs, links, paths) traversed by the service. The near-end NE 14 generates (step 192) a nodal SFC report identifying the degraded service and the facility elements of the transport network supporting that service. In embodiments having the SMC 22, the near-end NE 14 sends (step 194) its nodal SFC report to the far-end NE 16, receives (step 196) the nodal SFC report of the far-end NE 16, and correlates (step 198) the nodal SFC reports of both service ends to provide an end-to-end SFC report correlating the degraded service and the affected transport facility. Again, service management 30, network management 28, or both can determine from the service report, nodal or end-to-end, which service and transport facility elements are affected by the service degrade. The service management 30 can decide (step 200) from the report whether to notify the customers (based on SLA) and the network management 28 can use the information to test the NEs in the path of the service.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for managing a service transported over a transport network between an ingress service termination point, where traffic of the service enters the transport network from a client network, and an egress service termination point, where the traffic of the service exits the transport network, the method comprising:
   receiving customer traffic at the ingress service termination point from the client network, the customer traffic belonging to a specific service and having a guarantee of transport from a service provider with one or more specific performance commitments;
   associating the customer traffic belonging to the specific service with a service identifier;
   measuring performance of the customer traffic belonging to the specific service at the ingress service termination point to produce an ingress performance of service (POS) service metric;
   measuring performance of the customer traffic belonging to the specific service at the egress service termination point to produce an egress POS service metric for the specific service, the egress POS service metric being different from the ingress POS service metric; and
   periodically exchanging the ingress and egress POS service metrics between the ingress service termination point and the egress service termination point.

2. The method of claim 1, further comprising establishing a packet-based virtual connection between the ingress service termination point and the egress termination point for carrying the customer traffic over the transport network.

3. The method of claim 1, further comprising establishing a dedicated circuit between the ingress service termination point and the egress termination point for transporting the customer traffic over the transport network.

4. The method of claim 1, wherein associating the customer traffic with a service identifier includes placing the service identifier in a packet of the customer traffic.

5. The method of claim 1, wherein associating the customer traffic with a service identifier includes maintaining a database at each service termination point that associates the service identifier with the customer traffic.

6. The method of claim 1, wherein the step of measuring performance of the customer traffic includes counting a Management Interface Base (MID) object defined for the customer traffic.

7. The method of claim 1, further comprising computing, at each service termination point, one of a rate of service (RoS) service metric and an availability of service (AoS) service metric based on the PoS service metric produced by that service termination point.

8. The method of claim 7, further comprising specifying a value for at least one of the service metrics in one of a service level agreement and a service level specification to provide a definition of terms for the service.

9. The method of claim 7, further comprising accessing one of the service termination points by service management to read a computed value for one of the service metrics.

10. In an optical transport network, a network element connected at one edge of the transport network to a client network for processing customer traffic belonging to a service, the network element comprising:
    a physical interface connecting the client network to the transport network, the physical interface receiving customer traffic belonging to the service and having a guarantee of transport from a service provider with one or more specific performance commitments;
    means for associating the customer traffic belonging to the service with a service identifier;
    means for measuring performance of the customer traffic belonging to the specific service at the ingress service termination point to produce an ingress performance of service (POS) service metric;

means for receiving am egress POS service metric measured at the egress service termination point, the egress POS service metric being different from the ingress POS service metric; and;

means for periodically exchanging the ingress and egress POS service metrics between the ingress service termination point and the egress service termination point.

11. The network element of claim 10, wherein the means for associating includes means for including the service identifier in a packet of the customer traffic.

12. The network element of claim 10, wherein the means for associating includes a database that associates the service identifier with the customer traffic.

13. The network element of claim 10, wherein the means for measuring performance of the customer traffic includes means for counting a Management Interface Base (MIB) object defined for the customer traffic.

14. The network element of claim 10, further comprising means for computing one of a rate of service (RoS) service metric and an availability of service (AoS) service metric based on the PoS service metric.

15. A network, comprising:

an ingress service termination point connected to a client network for receiving customer traffic belonging to a service that has a guarantee of transport granted by a service provider with one or more specific performance commitments, the ingress service termination point comprising a physical interface connecting the client network to a transport facility of the network; and an egress service termination point in communication with the ingress service termination point over the transport facility, wherein each service termination point comprises:

means for measuring performance of the customer traffic to produce ingress and egress performance of service (POS) metrics at the ingress service termination point and the egress service termination point, respectively, and the ingress and egress POS metrics periodically being exchanged between the ingress service termination point and the egress service termination point.

16. The network of claim 15, wherein the means for correlating includes means for associating a service identifier with the customer traffic.

17. The network of claim 15, further comprising means for computing one of a rate of service (RoS) service metric and an availability of service (AoS) service metric based on the PoS service metric.

18. The network of claim 17, further comprising a computing system in communication with one of the service termination points to read a computed value for one of the service metrics.

19. The network of claim 15, wherein the means for measuring performance of the customer traffic includes means for counting a Management Interface Base (MIB) object defined for the customer traffic.

20. The method of claim 1, further comprising installing the service identifier at each service termination point when the specific service is provisioned.

21. The method of claim 1, further comprising receiving, at the ingress service termination point, the service message from the egress service termination point; and comparing, at the ingress service termination point, the PoS service metrics produced by the ingress and egress service termination points.

22. The method of claim 1, further comprising:

producing, by each of the ingress and egress service termination points, an availability of service (AoS) service metric for the specific service based on the PoS service metric produced by that service termination point; and producing an end-to-end AoS service metric based on the AoS service metrics produced by both service termination points.

23. The method of claim 1, further comprising intercepting and processing the service message at a core network element in a path between the ingress and egress service termination points taken by the customer traffic belonging to the specific service.

24. The network of claim 15, further comprising a core network element in a path between the ingress and egress service termination points taken by the customer traffic belonging to the specific service, the core network element intercepting and processing service messages generated by the ingress and egress service termination points and traversing the path there between.

* * * * *